(12) United States Patent
Stewart, III (10) Patent No.: US 8,746,647 B2
(45) Date of Patent: Jun. 10, 2014

(54) DEVICE FOR IMPLEMENT STORAGE

(76) Inventor: Kenneth G. Stewart, III, Bradenton, FL (US)

( * ) Notice: Subject to any disclaimer, the term of this patent is extended or adjusted under 35 U.S.C. 154(b) by 2416 days.

(21) Appl. No.: 11/067,743

(22) Filed: Mar. 1, 2005

(65) Prior Publication Data

US 2006/0219851 A1    Oct. 5, 2006

(51) Int. Cl.
*F16M 13/00*    (2006.01)
(52) U.S. Cl.
USPC ............................ 248/506; 248/510; 248/691
(58) Field of Classification Search
USPC .................... 248/506, 510, 690, 691, 213.1; 224/551; 403/213; 220/751, 760–764, 220/767, 769, 770, 771, 773
See application file for complete search history.

(56) References Cited

U.S. PATENT DOCUMENTS

| | | | |
|---|---|---|---|
| 468,639 A | 2/1892 | Bryant | |
| 828,519 A | 8/1906 | Seng | |
| 939,508 A | 11/1909 | Hull | |
| 1,435,744 A | 11/1922 | Santaniello | |
| 1,486,566 A | 3/1924 | Crecelius | |
| 1,713,077 A | 5/1929 | Frizl | |
| 1,763,798 A | 6/1930 | Mann | |
| 1,778,075 A | 10/1930 | Frances | |
| 2,088,812 A | 8/1937 | Reichenbach | |
| 2,427,004 A | 9/1947 | Kampf | |
| 2,429,797 A | 10/1947 | Bovenzi | |
| 2,538,778 A | 1/1951 | Halpin | |
| 2,553,334 A | 5/1951 | Schmidt | |
| 2,646,911 A | 7/1953 | Holmberg | |
| 3,233,745 A * | 2/1966 | Hershberger | ................. 211/104 |
| 3,239,182 A | 3/1966 | Blanz | |
| 3,647,604 A * | 3/1972 | Schoenherr et al. | ......... 248/27.8 |
| 3,660,861 A | 5/1972 | Delmonico | |
| 3,915,308 A | 10/1975 | Ratzloff et al. | |
| 3,995,803 A | 12/1976 | Uitz | |
| 4,166,637 A * | 9/1979 | Salomon | ...................... 280/625 |
| 4,209,157 A | 6/1980 | Edmisten | |
| 4,467,925 A | 8/1984 | Ratzloff et al. | |
| 4,519,566 A | 5/1985 | Manzi | |
| 4,628,893 A | 12/1986 | Shaw, III | |
| 4,632,242 A | 12/1986 | Choi et al. | |
| 4,693,381 A | 9/1987 | Lodge | |
| 4,727,620 A | 3/1988 | Gummelt | |
| 5,236,111 A | 8/1993 | Ferguson | |
| 5,607,174 A | 3/1997 | Ambrogio | |
| 5,685,512 A | 11/1997 | Yang | |
| 5,755,414 A | 5/1998 | Remmers | |
| 5,762,210 A | 6/1998 | Dahill | |
| D447,848 S | 9/2001 | Laga et al. | |
| 6,609,693 B2 | 8/2003 | Hui | |
| 6,923,325 B2 * | 8/2005 | Duban-Hu et al. | ........... 206/711 |

FOREIGN PATENT DOCUMENTS

FR    862757    3/1941

* cited by examiner

*Primary Examiner* — Steven Marsh
(74) *Attorney, Agent, or Firm* — Barnes & Thornburg LLP (57) ABSTRACT

A device for aiding in storing implements comprising a retractable support adapted to engage a hook. The support being held to an implement via a monolithically formed, or attached, base portion. The device being capable of use with a wide variety of implements and having various forms adaptable for use to aid in hanging implements or for assisting them to stand alone. The support being retractable and capable of being held in various positions via an interference fit.

8 Claims, 6 Drawing Sheets

DEVICE FOR IMPLEMENT STORAGE

BACKGROUND OF THE INVENTION

1. Field of the Invention

The invention relates to a support (or device) for storing implements.

Supports integral with an implement are disclosed for use, for example, for storing implements such as a wheelbarrow. A support which includes the shape of a hook is disclosed which can function as a hanger or as a support. The support is also useful for hanging or supporting other implements and provides a simple, inexpensive attachment for storing items of a wide range of sizes in an orderly manner.

2. Description of the Related Technology

U.S. Pat. No. 6,766,997, by the present inventor, is directed to a device for hanging implements comprising a hook member having two straight parallel arms with the first end of each arm joined by an arcuate section and with the opposite end of each arm extending at an angle with respect to its respective arm, and a generally flat base member for joining the hook to the implement. The disclosure of U.S. Pat. No. 6,766,997 is hereby incorporated herein by reference.

U.S. Pat. No. 3,915,308 discloses a rack for storing a wheelbarrow. The rack is mounted on a wall and the wheelbarrow is stored by placing it onto the rack.

U.S. Pat. No. 468,639 discloses a handle for brooms, umbrellas, dippers, etc. The handle is extendable with respect to the implement.

U.S. Pat. No. 4,519,566 discloses a rotatable accessory to facilitate storage for long handled implements. The accessory comprises a fixed position part of metal or plastic secured by a screw to a handle end, a part rotatable 360 degree. around the fixed position part loosely held between the uppermost end of an implement handle and the secured part, a wire ball hanger part which pivots from side to opposing side of a handle end held by the rotatable part thus allowing the implement end of a handle to always be in alignment with a projection which can accept the bail.

U.S. Pat. No. 5,607,174 discloses a ring which can be used to hang the bucket of a wheelbarrow for storage.

SUMMARY OF THE INVENTION

The invention is directed to a support having a portion for engaging a hook and supporting a wheelbarrow or other device in a stored position. The support enabling a wheelbarrow or other implement to be hung or to stand upright on its own.

Wheelbarrows as well as other implements are often of a size and shape so as to limit the options for their storage. Most often they are stored on the floor or next to a wall in an out of the way location. The present invention when used in conjunction with a wheelbarrow facilitates storage in a convenient manner. Lawn carts, wagons, lawn barrows, shovels, paint brushes, brooms, toys, kids cars, lawn mowers, saw horses, folding work benches, ladders and other similar devices are also conveniently stored with the use of the support of the present invention. Any device which can be hung for storage is contemplated for use with the present invention.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
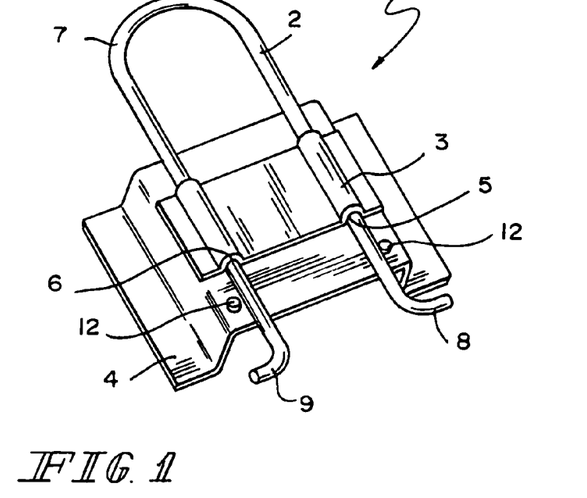
FIG. 1 shows a perspective view of one embodiment according to the invention.

The embodiment shown in FIG. 1 shows hanger hook 1 having a U-shaped member 2 which is affixed to a base bracket 4 via connector 3. Member 2 has two arm portions extending in a parallel direction and joined by a spanning portion 7 (shown as arcuate) at one end of the two arm portions. The other ends 8 and 9 of the arm portions extend at an angle to the parallel direction to form a J-shape. U-shaped member 2 may be formed of metal such as aluminum or of plastic or any other material which can be used in the manner described. The connector 3 may be formed monolithically with the base bracket 4 or formed separately and joined as by welding, adhesive bonding, bolting or other similar means. The connector 3 has channels 5, 6 which accommodate the U-shaped member 2 so that the U-shaped member 2 can slide in a direction along the axis of the two arm portions for a fixed distance in either axial direction. Sliding of the U-shaped member 2 in one axial direction extends the spanning portion 7 of the U until the opposite J-shaped ends 8, 9 engage the ends of the channels 5, 6 and prevent further axial movement in that direction (FIG. 4). It is understood that the channels 5, 6 are oriented and shaped to ensure that the U-shaped member 2 will pass clear of obstructions such as lip 11 (see FIG. 3) of a wheelbarrow or other implement as the U-shaped member moves to and from the use and stored positions. In the position shown spanning portion 7 is extended to the use position and can engage a hook 10 on a pegboard or other structure to permit the attachment of an attached implement, e.g. a wheelbarrow, to be hung from a wall hook 10 as shown in FIG. 4 wherein the hanger hook 1 is affixed to the tub portion of a wheelbarrow with the spanning portion extending past the lip 11 of the wheelbarrow pan a sufficient distance so that it can be engaged by wall hook 10 to secure the wheelbarrow to be stored. When the wheelbarrow is in use the U-shaped member 2 tends (by gravity) to move axially in the opposite direction so that the spanning portion is retracted out of the way below the lip 11 of the wheelbarrow. Although the spanning portion 7 is depicted as U-shaped, it may be V-shaped or other similar shape.

As seen in FIG. 1, the base bracket 4 may be provided with a bump protuberance 12 over which the J-shaped ends 8, 9 snap past. The snap action will hold the J-shaped members in either an extended or retracted position. One or two protuberances 12 can be used.

Figure 2:
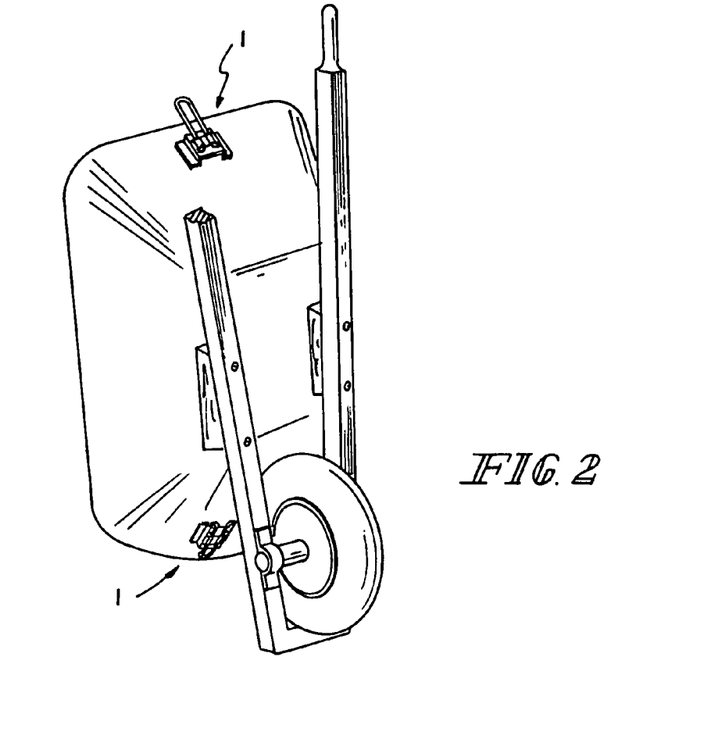
FIG. 2 shows a perspective view of a wheelbarrow having supports according to the invention affixed to different locations on the bed or pan of the wheelbarrow.

In FIG. 2 the hanger hook 1 is shown attached to a wheelbarrow in more than one location. If the top shown support is used with the hanger hook 1 of FIG. 4 the wheelbarrow is stored wheel down and if the bottom shown support is used with the hanger hook 1, the wheelbarrow is stored with the wheel up. If a base bracket 4 has a strong magnet it can be manually attached to the wheelbarrow tub at either end or at an intermediate location. FIG. 2 shows a hanger hook 1 attached near the lip 11 of the wheelbarrow and another hanger hook 1 fixed to the lower end of the wheelbarrow pan. When fixed to the lower end of the wheelbarrow pan the spanning portion 7 can function as a support to hold the wheelbarrow in an upright position standing on its own. When used in this manner the U-shaped member 2 must be capable of being fixed so that it remains in the extended position. This is evident from FIG. 2 wherein the lower hanger hook 1 has U-shaped member 2 that is not slidable, rather it is releasably fixed in the extended position so as to provide, in conjunction with the ends of the two handles, a three point stand. This stance permits the wheelbarrow to be stored on its own without the need for a wall hook. This permits the wheelbarrow to be stored in a variety of locations, not always in the same location or where there is a wall, or other type, hook. The bump protuberances 12 could also be effective to hold the U-shaped member 2 in an extended position.

Figure 3:
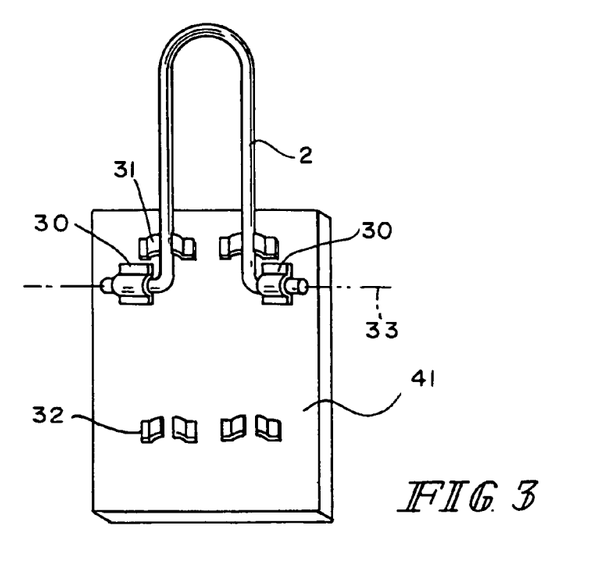
FIG. 3 shows a second embodiment of a support according to the invention.
Figure 4:
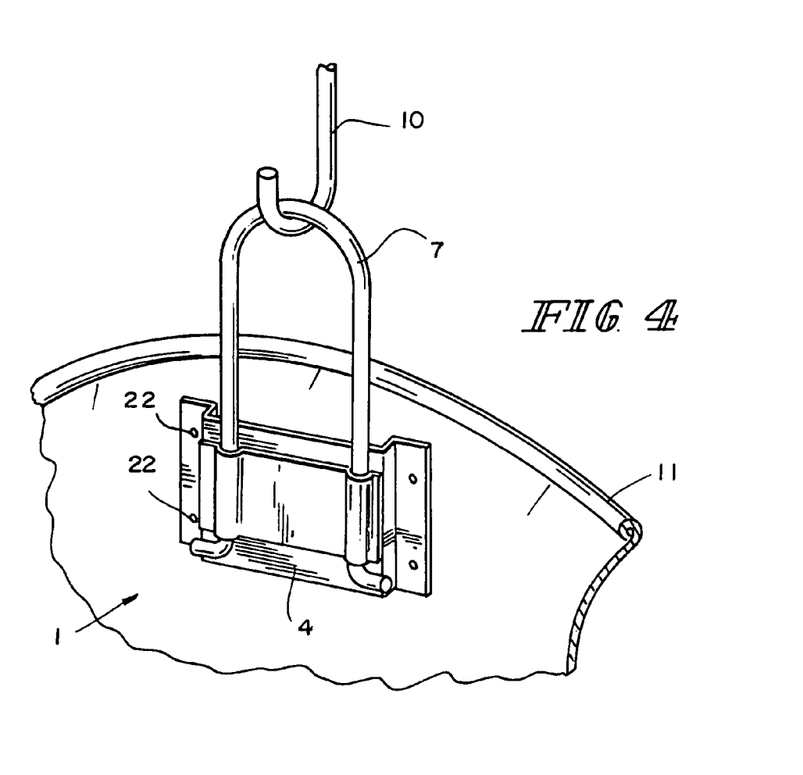
FIG. 4 shows a support used for hanging a wheelbarrow from a hook.

FIG. 3 shows one manner of providing the U-shaped member in a fixed orientation. As shown in FIG. 3 the U-shaped member 2 is pivotably supported, rather than slidably supported. In this arrangement the end legs of the U-shaped member 2 are substantially straight and are held by brackets 30 so that they pivot about the axis 33. Brackets 30 hold the U-shaped member 2 to fixture 41 which is joined to the wheelbarrow or other implement by fastening means (not shown) such as screws, bolts, adhesives, magnets or other similar means. For example, FIG. 4 shows holes 22 on edges of the base bracket 4 for receiving screws or bolts. These edges could be magnetic, or magnets could be placed under the edges (if the bracket is iron) or attached to the bracket (if it is not iron). A magnetic attachment allows for quick attachment and use of the hangar on many different tools or items. To retain the hanger hook in the extended position shown for either hanging the implement or supporting the implement, like a wheelbarrow, in a standing position, a set of clasps 31 can be provided. The clasps 31 are C-shaped with the opening being slightly smaller than the diameter of the U-shaped member 2 so that they provide an interference fit to hold the U-shaped member in the extended position shown. Clasps 31 may be made of rubber, aluminum or other similar material which will flex slightly to permit the U-shaped member to pass between the ends of the C yet retain it when it is held by the clasps 31. A second set of clasps 32 is provided as shown for holding the U-shaped member in a stored, or retracted out of the way, position. The U-shaped member is pivoted about axis 33 away from the extended position of clasps 31 (as shown in FIG. 3) into engagement with the clasps 32 for retaining the U-shaped member 2 in a retracted or stored position.

Figure 5:
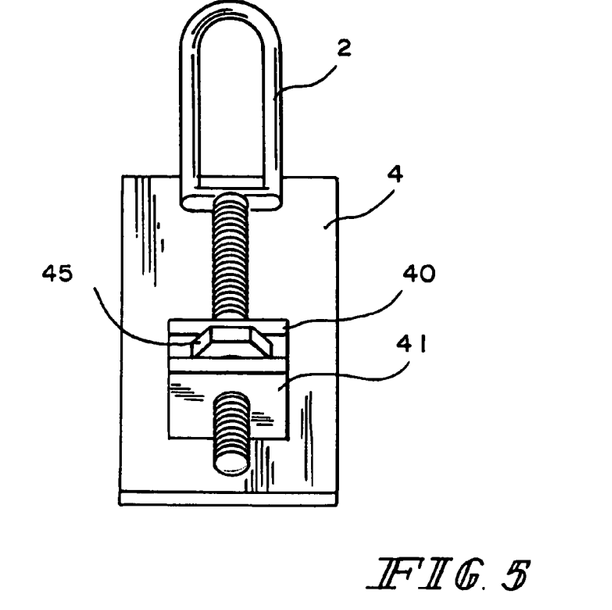
FIG. 5 shows a third embodiment of a support according to the invention.

FIG. 5 shows yet another embodiment wherein the U-shaped member has the legs joined at one end in a single threaded rod that is held to bracket 4 via two plates 40, 41 and a nut 45. The plates 40, 41 are joined to the bracket 4 by welding or other bonding or being formed monolithically with the bracket 4. The rod is held by and extends through holes in the plates 40, 41. When the nut is turned the rod moves axially and extends or retracts the U-shaped member. The thread characteristics, e.g., pitch, etc. are selected to enable easy turning of the nut to permit adjustment as desired but with sufficient resistance to enable the implement to be hung or supported as shown in FIG. 2 without turning of the nut. Plates 40, 41 may be formed separately from, or monolithic with, bracket 4 and bracket 4 may be formed separately from, or monolithically with, the implement (wheelbarrow, lawn cart, wagon, lawn barrow, shovel, paint brush, broom and other similar device).

Figure 6:
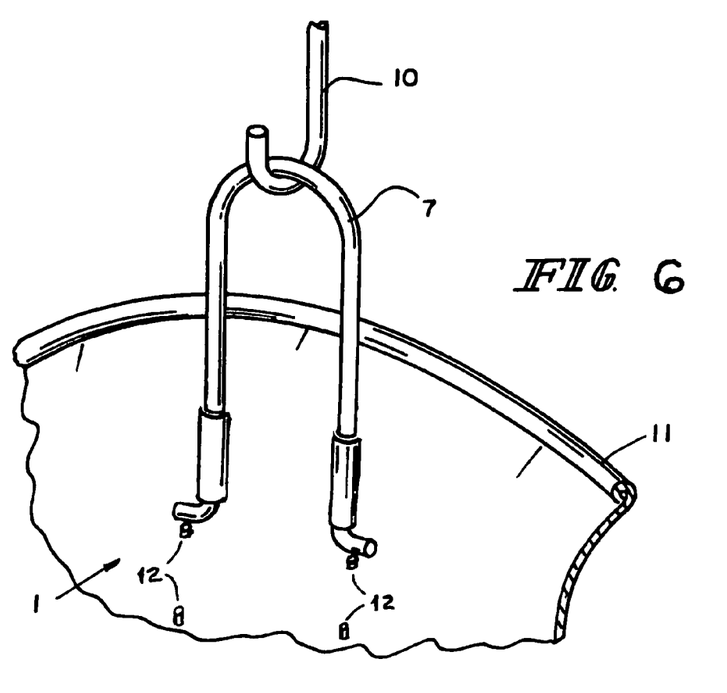
FIG. 6 shows a fourth embodiment of a support according to the invention.

As previously indicated, many different types of attachment schemes can be used to attach the bracket 4 to the item to be supported. Where adhesives are utilized, they can be protected by a peel strip, which is peeled off to expose an adhesive surface to attach the bracket 4 to the item to be supported. Likewise, one could use a hook and loop-type fastener (e.g., VELCRO) for attaching the bracket 4. FIG. 6 shows connector 3 and bracket 4 as an integral portion of the wheelbarrow pan. The wheelbarrow pan may, for example, be molded from plastic with channels 5, 6 being a monolithic portion of the wheelbarrow (or other implement) so as to enable attachment of the member 2 without having to provide a separate member for attachment to the implement. Injection molding of the wheelbarrow pan (or other implement portion) with member 2 being provided as an insert as is commonly known in the art is one way to construct the arrangement of FIG. 6. Molding of the wheelbarrow pan (or other implement portion) and subsequently inserting the unbent arms of the U-shaped member 2 into channels 5, 6 and then bending the ends of the U-shaped member 2 to provide J-shaped ends 8, 9 is another way to manufacture the present arrangement.

As best seen in FIG. 6 two sets of protuberances 12 may be provided. As viewed in FIG. 6 the upper set of protuberances 12 retain the ends 8, 9 in the extended position and the lower set 12 may retain the ends 8, 9 in a retracted position. Protuberances 12 may be provided as monolithic portions of the implement or they may be attached as by adhesive, soldering, screw threaded attachment, etc. The ends of protuberances 12 may be rubber, plastic, metal, wood or other material that will wear without need for frequent replacement. The advantage of the use of rubber, for example, provides flexibility in permitting the ends 8, 9 to slide over each protuberance 12 and also provides a smooth material that is less likely to cut or bruise a person's fingers. Each protuberance 12 can be formed monolithically with the implement or each protuberance 12 can be affixed to the implement by, for example, bonding (adhesive, welding, etc.), screwing or bolting, etc. The protuberance may have the rubber or other desired material added to the protuberance by bonding, coating or other known joining techniques. The j-shaped ends 8, 9 may be provided in the form of rubber or plastic portions that are a monolithic part of member 2 or provided as caps fit over and attached to each of the straight end portions of the elongated side by side arms of member 2.

Figure 7:
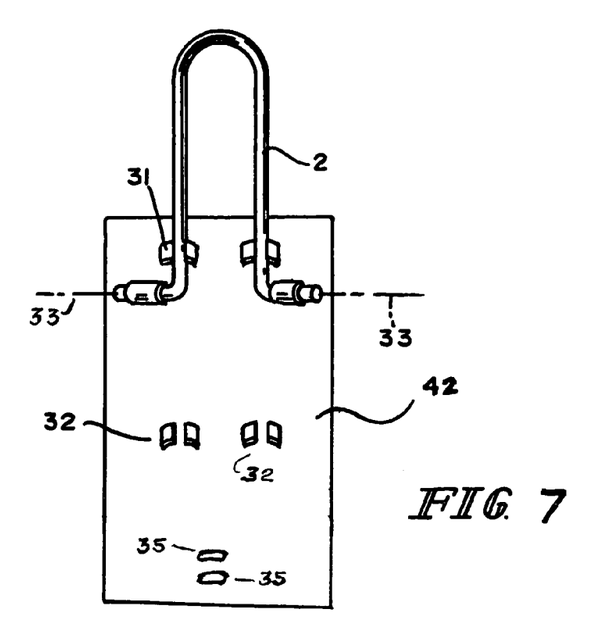
FIG. 7 shows a fifth embodiment of a support according to the invention.

FIG. 7 shows an embodiment similar to FIG. 3 with clasps 31 and 32 formed as a monolithic portion of implement 42. Two clasps 32 are shown, each placed to grasp an arm of the U-shaped member 2, however, use of only one clasp 32 is contemplated as is placement of the clasp 32 so as to grasp other portions including the U-shaped connector portion. Clasp 32 may be of any appropriate shape. An alternate, or additional, clasp formed by two spaced projections 35 is also shown. The space between projections 35 is sized and located to form an interference fit with a portion of the spanning portion 7 when the U-shaped member 2 is rotated from the use position (to hang the implement) to the storage position (wherein the U-shaped member 2 is stowed and does not interfere with use of the implement). Use of one, or both, projections 35 without any of clasps 32 will also provide proper retention of the U-shaped member in the storage position.

Figure 8:
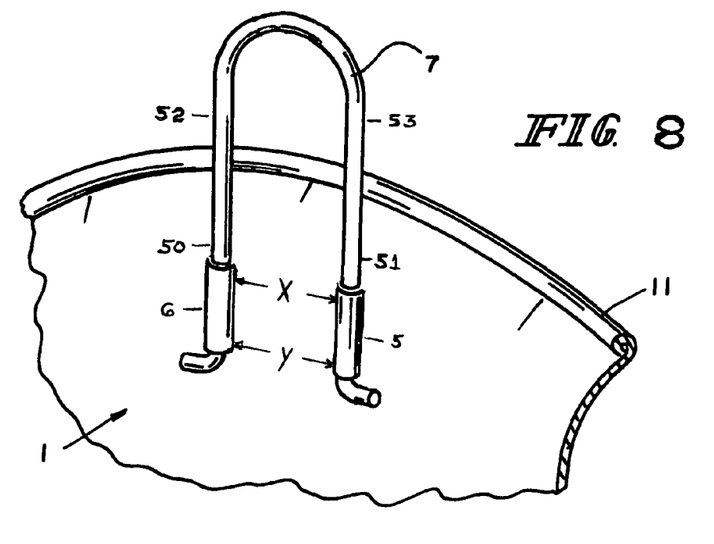
FIG. 8 shows an embodiment in the use position before moving to the retracted position wherein the U-shaped member is held in an interference fit.

FIG. 8 shows a hanger hook 1 like the hanger hook 1 of FIG. 1, but with channels 5, 6 in non-parallel relation. As seen in FIG. 8 channels 5, 6 diverge slightly (dimension X is slightly shorter than dimension Y). Diverging channels 5, 6 permit the U-shaped member to be gripped in an interference (friction) fit as the U-shaped member is moved from the extended to the retracted position. That is, as the U-shaped member is moved from the extended to the retracted position the lower arm portions 50, 51 elastically bend slightly outwardly as they pass through channels 5, 6. However, as the spanning portion 7 approaches the ends of channels 5, 6 there is increased resistance to flex and the upper arm portions 52, 53 become wedged against the channels 5, 6 forming an interference fit holding the U-shaped member in the retracted position. The channels 5, 6 need only be slightly angled with respect to each other, e.g., they may form an angle of about 1°. This configuration permits the U-shaped member to be retained in a stored position without the need for protuberances 12, clasps 32 or the like. The channels 5, 6 may be formed of elastic material sufficient to permit repeated interference fit as U-shaped member is moved from to and from the extended and retracted positions. An interference (friction) fit is defined as wherein a part or portion is moved in a direction and becomes wedged against another part or portion whereby further movement in that direction and in an opposing direction is inhibited.

Figure 9:
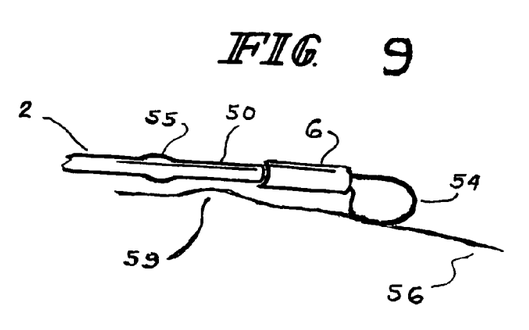
FIG. 9 shows additional embodiments of an interference fit for holding the elongated arm in a desired position.

FIG. 9 shows lower arm portion 50 having enlarged end 54 which is wedged in an interference (friction) fit against the face 56 of the implement on which channel 6 is mounted. As seen in FIG. 9, when portion 50 is moved (in the direction of the arrow shown) to the use position enlarged end 54 comes into contact with face 55 of the implement so that an interference fit is formed. In this configuration the face 55 may be shaped to enable the end 54 to move freely when away from channel 6 and to engage end 54 when end 54 approaches channel 6 (e.g., face 55 slopes downwardly away from channel 6). Flexible lower arm portions 50, 51 and upper arm portions 52, 53 elastically bend as enlarged end 54 is moved to and from the use and retracted positions. The end 54 may be of any desirable shape and end 54 may be provided in the form of rubber or plastic portion that is a monolithic part of member 2 or provided as a cap or coating fit over and attached to the straight end portion of the elongated side of one or both arms of member 2.

It should be understood that the embodiment of FIG. 9 is not limited to formation of the enlarged end 54 only at the end of the arm. FIG. 9 illustrates another enlarged portion 55 which, like portion 54, becomes wedged in an interference fit with obstruction 59 on the face 56 of the implement or with channel 6 (if there is no obstruction 59 or if enlarged portion 55 is forced past obstruction 59). Such enlarged portions 54, 55 may be located at any desired point on the shaft 50 such that an enlarged portion encounters and becomes wedged against adjacent structure and holds the shaft via an interference fit in a desired location. Thus, by use of such enlarged portions 54, 55, an interference fit can be used to hold the shaft 50 in any desired position.

Figure 10:
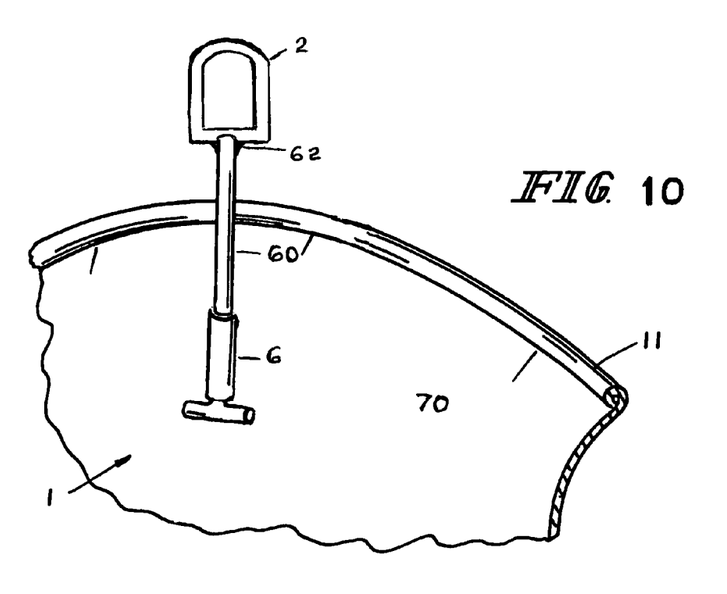
FIG. 10 shows a sixth embodiment of a support according to the invention.
Figure 11:
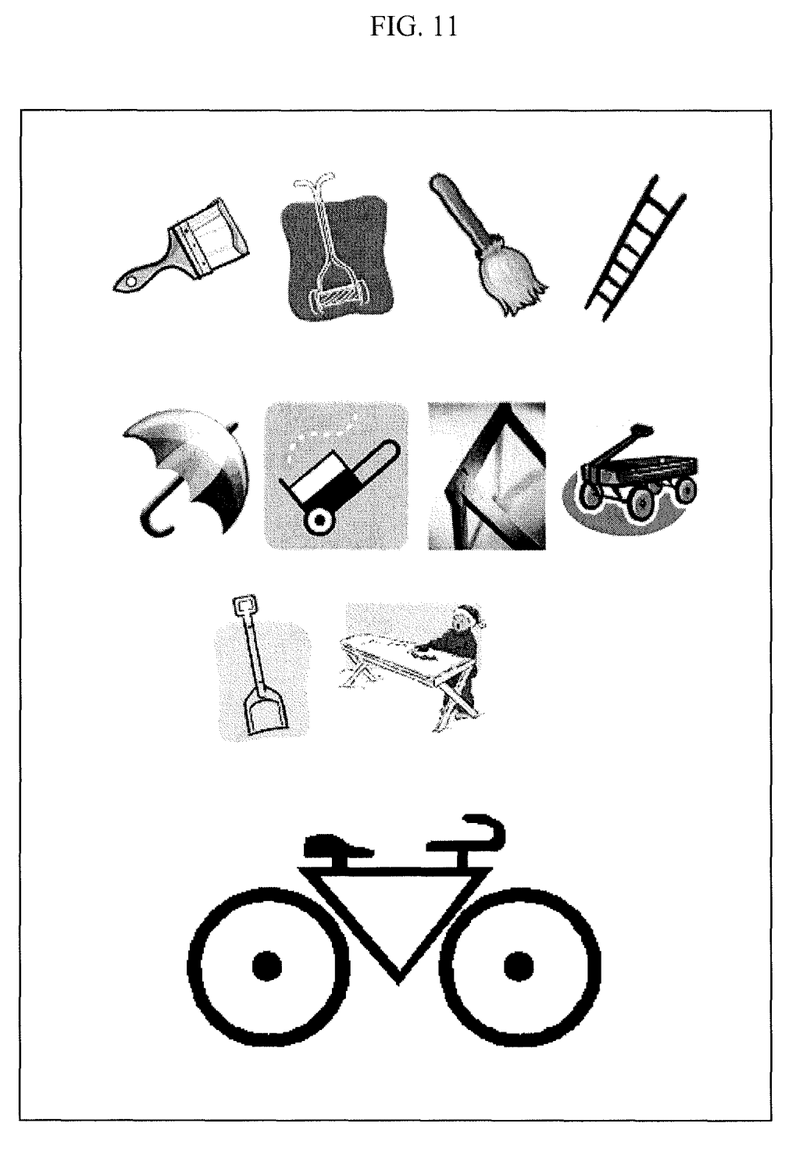
FIG. 11 shows a variety of conventional implements.

FIG. 10 shows a U-shaped member 2 wherein a single arm 60 connects the U-shaped member 2 to an implement 70 and a single channel 6 holds the arm 60 to the implement 70. In this embodiment arm 60 may be tapered along its length with a wider diameter at each end (i.e., a smaller diameter in the center of the length of the arm 60. As the arm moves to the storage and use position wider portion 62 becomes wedged in an interference fit in channel 6. The wider end diameters of arm 60 being slightly greater than the inside diameter of channel 6. This enables the U-shaped member 2 to be firmly held in both the stored and use positions without the use of gripping members such as clasps 32, 35 or protuberances 12.

Although the present invention has been described and illustrated in detail, it is to be clearly understood that the same is by way of illustration and example only, and is not to be taken by way of limitation. Combinations of the illustrated embodiments are contemplated. For example, whereas the embodiment of FIG. 6 has the arms being held by protuberances 12, substitution of the holding configuration of FIG. 9 or FIG. 10 is also contemplated by the present disclosure. The spirit and scope of the present invention are to be limited only by the terms of the appended claims.

The invention claimed is:

1. A device for facilitating storage of an implement comprising,
an elongated member having a length, a first end shaped to provide an opening for removable attachment to a hook and a second end having a first enlarged retaining portion, the elongated member being coupled to the implement and adapted to support the implement,
a base having a portion for retaining the elongated member on the base and for slidable movement of the member along its length, with respect to the base, between a use position for supporting the implement and a storage position whereby the elongated member is stored out of the way while the implement is used,
the base forming an exterior portion of the implement, and
a second enlarged retaining portion on the elongated member located to hold the member in an interference fit in one of the following
a) the use position wherein the elongated member is extended for supporting the implement, and
b) the storage position whereby the elongated member is retracted and stored out of the way while the implement is used.

2. The device of claim 1 wherein the base forms a monolithic portion of the implement.

3. The device of claim 1 wherein the member is adapted to support the implement by hanging.

4. A device for facilitating storage of an implement comprising,
an implement,
a member having two arms extending in a generally parallel direction with a first end of each arm joined by a spanning section and with each arm having a portion shaped to prevent removal from a holding portion,
a base forming a monolithic portion of the implement, the base having a channel holding portion for retaining the joined arms on the base,
the base and member being adapted for slidable movement of the member along the length of the arms, with respect to the base, between a storage position and a use position wherein the member is exposed for supporting the implement, and
wherein the channel holding portion includes two diverging channels that grip the U-shaped member in an interference fit as it is moved from the storage position for storing the implement to the use position wherein the implement is ready for use.

5. A device for facilitating storage of an implement comprising,
an implement, a member having two arms extending in a generally parallel direction with a first end of each arm joined by a spanning section and with the opposite end of each arm forming a retaining portion, a base having first and second portions for retaining the joined arms on the base and for slidable movement of the member along the length of the arms, with respect to the base, between a storage position and a use position for supporting the implement, the base forming a monolithic portion of the implement, and the retaining portions being shaped to hold the member in one of the following    a) a use position for supporting the implement, and    b) a storage position whereby the member is stored out of the way while the implement is used, and wherein the first and second portions diverge and grip the U-shaped member in an interference fit as it is moved from the storage position for storing the implement to the use position wherein the implement is ready for use.

6. The device of claim 4 wherein the member includes a wider portion that forms an interference fit with the channel in the storage position for storing the implement or in the use position wherein the implement is ready for use.

7. The device of claim 6 wherein the member includes a second wider portion that forms a second interference fit and wherein the member moves freely in the channel when the member is between the storage position for storing the implement and the use position wherein the implement is ready for use.

8. The device of claim 1 wherein the member and base form an interference fit in one of the storage position and the use position and the member moves freely with respect to the base between the storage and use positions.

* * * * *